United States Patent
Steenbakkers-Menting et al.

(10) Patent No.: US 11,988,319 B2
(45) Date of Patent: May 21, 2024

(54) PROPYLENE-BASED TERPOLYMER COMPOSITION FOR PIPES

(71) Applicant: SABIC GLOBAL TECHNOLOGIES B.V., Bergen Op Zoom (NL)

(72) Inventors: Henrica Norberta Alberta Maria Steenbakkers-Menting, Susteren (NL); Patrick Elisabeth Luc Voets, Born (NL); Ralf Kleppinger, Selfkant (DE); Désirée Marie Louise Seegers, Maastricht (NL); Harm Caelers, Koningslust (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 17/795,662

(22) PCT Filed: Jan. 25, 2021

(86) PCT No.: PCT/EP2021/051632
§ 371 (c)(1),
(2) Date: Jul. 27, 2022

(87) PCT Pub. No.: WO2021/151840
PCT Pub. Date: Aug. 5, 2021

(65) Prior Publication Data
US 2023/0087683 A1    Mar. 23, 2023

(30) Foreign Application Priority Data

Jan. 27, 2020 (EP) ..................... 20153923

(51) Int. Cl.
| F16L 9/12 | (2006.01) |
| C08F 210/02 | (2006.01) |
| C08F 210/06 | (2006.01) |
| C08F 210/14 | (2006.01) |
| C08K 3/013 | (2018.01) |
| C08K 5/098 | (2006.01) |

(52) U.S. Cl.
CPC .............. *F16L 9/12* (2013.01); *C08F 210/02* (2013.01); *C08F 210/06* (2013.01); *C08F 210/14* (2013.01); *C08K 3/013* (2018.01); *C08K 5/098* (2013.01); *C08F 2500/36* (2021.01)

(58) Field of Classification Search
None
See application file for complete search history.

(56) References Cited

U.S. PATENT DOCUMENTS 4,579,836 A    4/1986  Azoumanidis et al.
2004/0220311 A1* 11/2004 Dotson ................ C07C 51/412
524/394

FOREIGN PATENT DOCUMENTS

| WO | 02078924 A2 | 10/2002 |
| WO | WO2006002778 | * 6/2005 |
| WO | 2006002778 A1 | 1/2006 |
| WO | 2011155999 A1 | 12/2011 |
| WO | 2013083575 A1 | 6/2013 |
| WO | 2018011177 A1 | 1/2018 |
| WO | 2018059955 A1 | 4/2018 |

OTHER PUBLICATIONS

International Search Report for International Application PCT/EP2021/051632, International Filing Date Jan. 25, 2021, dated Apr. 13, 2021, 5 pages.
Written Opinion for International Application PCT/EP2021/051632, International Filing Date Jan. 25, 2021, dated Apr. 13, 2021, 7 pages.

* cited by examiner

*Primary Examiner* — Lee E Sanderson

(74) *Attorney, Agent, or Firm* — CANTOR COLBURN LLP

(57) ABSTRACT

The invention relates to a pipe comprising a polypropylene composition (P) comprising a terpolymer composition (A), a nucleating agent (B) and optionally a composition comprising pigment (C), wherein the terpolymer composition (A) comprises at least one terpolymer prepared from propylene, ethylene and 1-hexene, wherein the nucleating agent (B) is a nucleating agent comprising a metal salt of hexahydrophthalic acid represented by formula (I) (I) wherein M1 and M2 are the same or different, and may be combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, C1-C9alkoxy, $C_1$-$C_9$ alkyleneoxy, amine, and $C_1$-$C_9$ alkylamine, halogens, and phenyl wherein the polypropylene composition (P) has a melt flow rate in the range from 0.10 to 0.70 dg/min as determined by ISO1133-1:2011 at 230° C. and 2.16 kg.

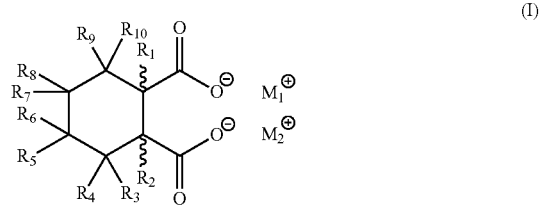

(I)

20 Claims, No Drawings

PROPYLENE-BASED TERPOLYMER COMPOSITION FOR PIPES

CROSS REFERENCE TO RELATED APPLICATIONS

This application is a National Stage application of PCT/EP2021/051632, filed Jan. 25, 2021, which claims the benefit of European Application No. 20153923.6, filed Jan. 27, 2020, both of which are incorporated by reference in their entirety herein.

FIELD

The invention relates to a polypropylene composition comprising a terpolymer composition, to articles, preferably pipes, comprising the polypropylene composition as well as to a process for the preparation of such composition and to the use of the polypropylene composition.

BACKGROUND

Polypropylene-based polymers have many characteristics which make them suitable for many applications, for instance pipes such as hot and cold water pressure pipes. For hot and cold water pressure pipes, it is especially important that such pipes show a long time to brittle failure especially at elevated temperatures in combination with a good impact resistance. A long time to brittle failure is necessary to ensure the lifetime of the pipe during use. A good impact resistance is very important during the handling (installation, transportation etc) of the pipe.

Attempts have been made to achieve favorable properties by using different types of comonomers and varying process conditions.

Use of propylene/ethylene/1-hexene terpolymers is known in the art for the production of pipes. For example WO2006/002778 relates to a pipe system comprising a terpolymer of propylene/ethylene and alpha olefin wherein the ethylene content is from 0 to 9% by mol, preferably from 1 to 7% by mol and the 1-hexene content ranges from 0.2 to 5% wt. WO2013/083575 discloses a terpolymer containing propylene, ethylene and 1-hexene wherein: (i) the content of 1-hexene derived units ranges from 1 wt % to 3.2 wt %, (ii) the content of ethylene derived units is higher than 1.4 wt %% and C2 content <C6 content −0.2, further defined by the MFR and the melting temperature.

There is still a need in the art for a pipe comprising a propylene-based terpolymer composition having a combination of a high pipe impact and a high hydrostatic pipe pressure resistance.

SUMMARY

It is an objective of the present invention therefore to provide a propylene/ethylene/1-hexene terpolymer composition from which pipes having a high pipe impact and a high hydrostatic pipe pressure resistance.

Accordingly, the invention provides a polypropylene composition (P) comprising a terpolymer composition (A), a nucleating agent (B) and optionally a composition comprising pigment (C), wherein the terpolymer composition (A) comprises at least one terpolymer prepared from propylene, ethylene and 1-hexene, wherein the nucleating agent (B) is a nucleating agent comprising a metal salt of hexahydrophthalic acid represented by formula (I)

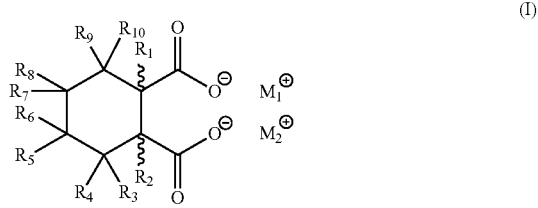

wherein $M_1$ and $M_2$ are the same or different, and may be combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C1$-$C_9$alkyl, hydroxy, $C_1$-$C_5$alkoxy, $C_1$-$C_5$alkyleneoxy, amine, and $C_1$-$C_9$ alkylamine, halogens, and phenyl wherein the polypropylene composition (P) has a melt flow rate in the range from 0.10 to 0.70 dg/min as determined by ISO1133-1:2011 at 230° C. and 2.16 kg.

It was surprisingly found that the polypropylene composition of the invention can be used to prepare pipes showing a high pipe impact resistance and a long time to brittle failure. In addition, the pipes prepared from the terpolymer of the invention may be extruded at higher speeds, which means that the pipes can be produced at a higher throughput and/or by using less energy, which is advantageous from both an environmental as well as from a cost perspective.

DETAILED DESCRIPTION

The term "pipe" as used herein also includes pipe fittings, valves and all parts which are commonly necessary for e.g. a hot water piping system. Also included within the definition are single and multilayer pipes, where for example the pipe may include one or more metal layers and may include one or more adhesive layers.

Polypropylene Composition (P)

Preferably, in the polypropylene composition (P), the weight ratio of the total amount of ethylene derived units to the total amount of 1-hexene derived units in the polypropylene composition (P) is at least 0.70, preferably at least 0.80, more preferably at least 0.90 and/or at most 3.0, preferably at most 2.5. This leads to a good balance of the pipe impact and the pipe pressure.

Preferably, the invention relates to a polypropylene composition (P) according to any one of the preceding claims, wherein the sum of the amount of terpolymer composition (A), nucleating agent (B) and the composition comprising pigment (C) is at least 95 wt % based on the polypropylene composition (P).

More preferably, the sum of the amount of terpolymer composition (A), nucleating agent (B) and the composition comprising pigment (C) is at least 96 wt %, for example at least 97 wt %, for example at least 98 wt % based on the polypropylene composition (P).

The polypropylene composition (P) may further comprise additives (D). Preferably, the polypropylene composition (P) does not comprise polymers other than the terpolymer. Preferably, the sum of the amount of the terpolymer composition (A), nucleating agent (B) and the composition comprising pigment (C) and the additives (D) is 100 wt % based on the polypropylene composition.

Examples of additives (D) which may be present in the polypropylene composition of the invention are additives suitable for use in pipes and include but are not limited to stabilizers, anti-oxidants, impact modifiers, flame retardants, acid scavengers, anti-microbials and the like. Such additives are well known in the art. The skilled person will choose the type and amount of additives such that they do not detrimentally influence the aimed properties of the composition.

For example, the amount of the additive D) in the composition is chosen from 0 to 5 wt % based on the total weight of the polypropylene composition (the polypropylene composition (P) comprises from 95 to 100 wt % of the sum of the amount of the terpolymer composition (A), nucleating agent (B) and the composition comprising pigment (C)), for example the amount of additive is from 1.0 to 3.0 wt % (the polypropylene composition (P) comprises from 97.0 to 99.0 wt % of the sum of the amount of the terpolymer composition (A), nucleating agent (B) and the composition comprising pigment (C)), based on the total weight of the polypropylene composition (P).

The melt flow rate (MFR) (ISO 1133-1:2011, 230° C., 2.16 kg) of the polypropylene composition (P) is from 0.10 to 0.70 dg/min, preferably from 0.10 to 0.50 dg/min, more preferably from 0.10 to 0.30 dg/min.

The total amount of ethylene derived units in the polypropylene composition (P) is preferably at least 1.5 wt %, for example at least 1.6 wt %, for example at least 1.7 wt % and/or for example at most 5.0 wt %, for example at most 4.0 wt %, for example at most 3.5 wt %, for example at most 3.0 wt %, for example at most 2.8 wt %.

Preferably, the total amount of ethylene derived units in the polypropylene composition (P) is from 1.5 to 5.0 wt %, for example from 1.6 to 4.0 wt %, for example from 1.6 to 3.5 wt %, for example from 1.7 to 3.5 wt %, for example from 1.7 to 3.0 wt %, for example from 1.8 to 2.8 wt %.

The total amount of 1-hexene derived units in the polypropylene composition (P) is at least 1.5 wt %. This ensures a high resistance to brittle failure and a high resistance to hydraulic pressure. For example, the total amount of 1-hexene derived units in the polypropylene composition (P) is at least 1.6 wt %, for example at least 1.7 wt %, for example at least 1.8 wt % and/or at most 4.0 wt %, for example at most 3.5 wt %, for example at most 3.0 wt %.

Preferably, the total amount of 1-hexene derived units in the polypropylene composition (P) is in the range from 1.5 to 4.0 wt %, for example in the range from 1.6 to 4.0 wt %, for example in the range from 1.7 to 4.0 wt %, for example in the range from 1.7 to 3.5 wt %, for example in the range from 1.8 to 3.0 wt %.

Preferably, for a good pipe pressure resistance, the content of ethylene derived units in the polypropylene composition (P) in wt % is similar to or larger than the content of 1-hexene derived units in the polypropylene composition in wt %.

Preferably, in the polypropylene composition (P), $$TC2 \geq TC6-0.20,$$

wherein TC2 stands for the total amount of ethylene-derived units in the polypropylene composition in wt % and wherein TC6 stands for the total amount of 1-hexene derived units in the polypropylene composition in wt %. More preferably, in the polypropylene composition (P), $$TC2 \geq TC6-0.10$$

wherein TC2 stands for the total amount of ethylene-derived units in the polypropylene composition in wt % and wherein TC6 stands for the total amount of 1-hexene derived units in the polypropylene composition in wt %. Most preferably, for the best pipe pressure resistance, in the polypropylene composition (P), $$TC2 > TC6$$

wherein TC2 stands for the total amount of ethylene-derived units in the polypropylene composition in wt % and wherein TC6 stands for the total amount of 1-hexene derived units in the polypropylene composition in wt %.

The total amount of ethylene derived units and the total amount of 1-hexene derived units in a polypropylene composition or in a terpolymer composition is determined by the method described herein in the section entitled "$^{13}$C-NMR for C2, C6 comonomer content".

Preferably, the polypropylene composition (P) has a <Gp>/Y of at least 7.0, more preferably of at least 7.5, more preferably of at least 8.0, wherein <Gp> stands for the strain hardening modulus and Y stands for the yield stress and wherein <Gp>/Y is determined by:
   a) providing a specimen of the composition by compression molding a sheet from the composition according to ISO 1873-2 to a thickness of 0.3 mm±0.025 mm and punching a specimen having a geometry of the test specimen described in ISO/DIS 18488 from the sheet, wherein the sheet is annealed after the compression molding and before the punching at a temperature of 100° C. for 1 hour and cooled down to room temperature,
   b) elongating the specimen at a constant traverse speed of 20 mm/min at 100° C.,
   c) measuring the load sustained by the specimen during the elongation to obtain a stress-strain curve and measuring the yield stress Y,
   d) calculating true stress-true strain curve from the stress strain curve obtained by step c) and calculating the tensile strain hardening modulus <Gp> from the true stress-strain curve, according to the method as described in ISO/DIS 18488 and
   e) calculating a quotient of the tensile strain hardening modulus <Gp> divided by the yield stress Y.

Preferably, the lowest temperature at which at most 1 out of 10 pipes made from the composition according to the invention fails as determined by DIN8078 (2008) is 0.0° C., preferably −1.0° C., more preferably −2.0° C., even more preferably −3.0° C., most preferably −4.0° C.

Preferably, a pipe prepared from the polypropylene composition (P) has a run time without failure of at least 5000 h as measured according to ISO1167-1 at a temperature of 95° C. and a hoop stress calculated according to ISO3213 of 4.2 MPa. Preferably, a pipe prepared from the polypropylene composition (P) has a run time without failure of at least 5000 h measured according to ISO1167-1 at a temperature of 20° C. and a hoop stress calculated according to ISO3213 of 13.0 MPa.

The polypropylene composition (P) preferably has a ratio of the weight average molecular weight (Mw) to the number average molecular weight (Mn), wherein Mw and Mn are measured according to ASTM D6474-12 in the range from 5.0 to 25.0, for example in the range from 6.0 to 22.0, for example from 7.0 to 20.0, for example in the range from 8.0 to 20.0, for example in the range from 8.0 to 16.0, for example in the range from 8.0 to 14.0.

Preferably, the polypropylene composition (P) has a polydispersity index (PI) in the range from 4.0 to 15.0, for example in the range from 5.0 to 15.0, preferably in the range from 6.5 to 12.0, wherein the PI is determined by dividing $10^5$ Pa by the cross-over modulus Gc, wherein the Gc occurs when the storage (G') and loss (G") moduli of the are equal and wherein G' and G" are measured with dynamic mechanical spectroscopy.

For example, the weight average molecular weight of the polypropylene composition (P) is from 500 to 1500 kg/mol, more preferably from 650 to 1100 kg/mol as measured according to ASTM D6474-12. For example, the numeric average molecular weight of the polypropylene composition (P) is from 70 to 110 kg/mol, more preferably from 80 to 105 kg/mol as measured according to ASTM D6474-12.

Terpolymer Composition (A)

Preferably, the terpolymer composition (A) has an XS of at most 10 wt % based on the terpolymer, more preferably the polypropylene composition (P) has an XS of at most 10 wt % based on the polypropylene composition (P). XS stands for the amount of xylene solubles which are measured using the conditions as described in the experimental section of the present application.

Preferably, the amount of terpolymer prepared from propylene, ethylene and 1-hexene in the terpolymer composition (A) is at least 95 wt %, more preferably at least 97 wt %, even more preferably at least 99 wt %, most preferably 100 wt % based on the terpolymer composition (A), that is, most preferably, the terpolymer composition (A) consists only of terpolymer(s) prepared from propylene, ethylene and 1-hexene.

The terpolymer in the terpolymer composition (A) may be monomodal or multimodal, for example bimodal, as detailed herein.

Nucleating Agent (B)

The nucleating agent in the composition according to the present invention comprises a metal salt of hexahydrophthalic acid represented by formula (I)

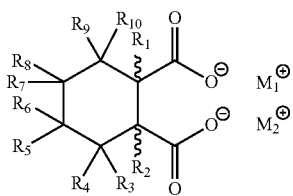

(I)

wherein $M_1$ and $M_2$ are the same or different, and may be combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, $C_1$-$C_5$alkoxy, $C_1$-$C_5$alkyleneoxy, amine, and $C_1$-$C_9$ alkylamine, halogens, and phenyl.

The use of such nucleating agent surprisingly leads to a higher pipe impact and improved hydrostatic pipe pressure resistance.

In one preferred embodiment, the $M_1$ and $M_2$ are combined as a calcium ion and preferably, the compound of formula (I) is a calcium cis-hexahydrophthalate compound of Formula (II):

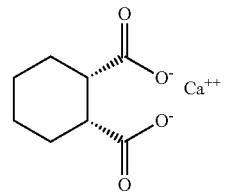

(II)

Preferably, the amount of the compound (I) or (II) in the nucleating agent (B) is at least 30 wt % of the nucleating agent. An example of a suitable nucleating agent comprising the compound of formula (II) is Hyperform® HPN-20E™ nucleating agent commercialized by Milliken. This nucleating agent comprises a calcium cis-hexahydrophthalate compound of Formula (II) and a stearate-containing compound as acid scavenger, e.g. zinc stearate, at a weight ratio of 2:1.

Preferably, the nucleating agent (B) is present in an amount from 10 to 5000 ppm (0.001 to 0.50 wt %), for example in an amount from 100 to 2500 ppm based on the polypropylene composition (P).

Pigment (C)

The pigment (C) may be added as such (the composition comprising pigment (C) consists of pigment (C), but is in practice usually added in the form of a masterbatch; that is in the form of a composition comprising the pigment (C) and a carrier, for example a polypropylene, for example a polypropylene chosen from the group consisting of propylene homopolymers, propylene random copolymers, for example terpolymers prepared from propylene, ethylene and 1-hexene; heterophasic propylene copolymers and mixtures thereof. The concentration of the pigment (C) in such masterbatch depends on the type of pigment, but is generally present in an amount from 0.1 to 30 wt % based on the weight of the masterbatch.

The optimal amount of masterbatch depends upon the type of pigment used as well as to the concentration of the pigment in the masterbatch. The amount of masterbatch is generally between 0.5 and 5.0 wt % based on the weight of the polypropylene composition (P), preferably between 1 and 2.5 wt %, typically around 2 wt %.

Preferably, the pigment (C) is present in an amount from 0.10 to 2.5 wt % based on the polypropylene composition (P), more preferably in an amount from 0.10 to 1.0 wt %.

For the avoidance of doubt, the term pigment as used herein also refers to mixtures of pigments. Examples of suitable pigments include but are not limited to inorganic pigments Examples of inorganic pigments include but are not limited to:

| Colour Index (C.I.) Designation | Chemical Formula (if known) | CAS Registry Number |
|---|---|---|
| C.I. pigment green 7 | phthalocyanine | CAS No. 1328-53-6 |
| C.I. pigment green 17 | $Cr_2O_3$ | CAS No. 68909-79-5 |
| C.I. pigment red 101 | A—$Fe_2O_3$ | CAS No. 1309-37-1 |
| C.I. pigment yellow 53 | $(Ti,Ni,Sb)O_2$ | CAS No. 71077-18-4 |
| C.I. pigment yellow 119 | $ZnFe_2O_4$ | CAS No. 68187-51-9 |
| C.I. pigment yellow 157 | $2NiO·3BaO·17TiO_2$ | CAS No. 68610-24-2 |
| C.I. pigment yellow 161 | $(Ti,Ni,Nb)O_2$ | CAS No. 68611-43-8 |
| C.I. pigment yellow 162 | $(Ti,Cr,Nb)O_2$ | CAS No. 68611-42-7 |
| C.I. pigment yellow 163 | $(Ti,Cr,W)O_2$ | CAS No. 68186-92-5 |
| C.I. pigment yellow 164 | $(Ti,Mn,Sb)O_2$ | CAS No. 68412-38-4 |
| C.I. pigment yellow 184 | $BiVO_4/(Bi,Mo,V)O_3$ | CAS No. 14059-33-7 |
| C.I. pigment yellow 189 | $(Ti,Ni,W)O_2$ | CAS No. 69011-05-8 |

-continued

| Colour Index (C.I.) Designation | Chemical Formula (if known) | CAS Registry Number |
| --- | --- | --- |
| C.I. pigment blue 28 | $CoAl_2O_4$ | CAS No. 68186-86-7 |
| C.I. pigment blue 36 | $Co(Al,Cr)_2O_4$ | CAS No. 68187-11-1 |
| C.I. pigment blue 36:1 | $(Zn,Co)(Cr,Al)_2O_4$ | CAS No. 74665-01-3 |
| C.I. pigment blue 72 | $(Co,Zn) Al_2O_4$ | CAS No. 68186-87-8 |
| C.I. pigment green 26 | $CoCr_2O_4$ | CAS No. 68187-49-5 |
| C.I. pigment green 50 | $(Co,Ni,Zn)_2TiO_4$ | CAS No. 68188-85-6 |
| C.I. pigment brown 24 | $(Ti,Cr,Sb)O_2$ | CAS No. 68186-90-3 |
| C.I. pigment brown 29 | $(Fe,Cr)_2O_3$ | CAS No. 12737-27-8 |
| C.I. pigment brown 33 | $(ZnFe)FeCr)_2O_4$ | CAS No. 68186-88-9 |
| C.I. pigment brown 35 | $Fe(FeCr)_2O_4$ | CAS No. 68187-09-7 |
| C.I. pigment brown 37 | $(Ti,Mn,Nb)O_2$ | CAS No. 70248-09-8 |
| C.I. pigment brown 39 | $(Zn,Mn)Cr_2O_4$ | CAS No. 71750-83-9 |
| C.I. pigment brown 40 | $(Ti,Mn,Cr,Sb)O_2$ | CAS No. 69991-68-0 |
| C.I. pigment brown 43 | $(Fe,Mn)_2O_3$ | CAS No. 12062-81-6 |
| C.I. pigment orange 75 | | CAS No. 12014-93-6 |
| C.I. pigment orange 78 | | CAS No. 12014-93-6 + 12031-49-1 |
| C.I. pigment red 265 | | CAS No. 12014-93-6 |
| C.I. pigment red 275 | | CAS No. 12014-93-6 |
| C.I. pigment blue 29 | $Na_{6-8}Al_6Si_6O_{24}S_{2-4}$ | CAS No. 57455-37-5 |
| C.I. pigment purple 15 | $Na_{6-8}Al_6Si_6O_{24}S_{2-4}$ | CAS No. 12769-96-9 |
| C.I. pigment purple 16 | $NH_4MnP_2O_7$ | CAS No. 10101-66-3 |
| C.I. pigment black 7 | carbon black | CAS No. 1333-86-4 |

One of the usual colours which is used for pipes is green. The colour green may be achieved by using a mixture of pigments to form pigment (C).

In one embodiment, the terpolymer composition (A) may be multimodal.

For example, in such embodiment, the terpolymer composition (A) comprises a first terpolymer (A1) consisting of units derived from propylene, ethylene and 1-hexene and a second terpolymer (A2) consisting of units derived from propylene, ethylene and 1-hexene and wherein the first terpolymer (A1) has a melt flow rate as determined by ISO1133-1:2011 at 230° C. and 2.16 kg in the range from 0.0030 to 1.0 dg/min, wherein the second terpolymer (A2) has a melt flow rate as determined by ISO1133-1:2011 at 230° C. and 2.16 kg in the range from 0.30 to 70.0 dg/min, preferably wherein the polypropylene composition (P)
(i) has an amount of ethylene derived units in the range from 1.6 to 3.0 wt %;
(ii) has an amount of 1-hexene derived units in the range from 1.7 to 4.0 wt %.
wherein the terpolymer composition is present in the polypropylene composition (P) in an amount of at least 95 wt % based on the polypropylene composition (P).

Preferably, in this embodiment, the weight ratio of the first terpolymer (A1) to the second terpolymer (A2) in the polypropylene composition (P) is in the range from 0.20 to 5.0, for example in the range from 0.25 to 4.0.

Single Reactor

The terpolymer composition (A) may be prepared by a process comprising preparing the first terpolymer (A1) and the second terpolymer (A2) in a single reactor to obtain the terpolymer composition (A). Preferably, the reactor is a gas-phase reactor, more preferably the reactor is a horizontal stirred reactor.

In a preferred embodiment, the terpolymer composition (A) is made by a process for polymerization of propylene, ethylene and 1-hexene in the presence of a catalyst system in a horizontal stirred reactor comprising an agitated bed for forming polymer particles,
a plurality of liquid feed ports that are subsequently arranged along a top side of the reactor above the agitated bed, the plurality of liquid feed ports comprising a first set of the liquid feed ports and a second set of the liquid feed ports arranged subsequent to the first set of the liquid feed ports in a downstream direction of the process, and a plurality of gas feed ports that are subsequently arranged along a bottom side of the reactor below the agitated bed, the plurality of gas feed ports comprising a first set of gas feed ports and a second set of gas feed ports arranged subsequent to the first set of gas feed ports in the downstream direction of the process,
wherein the process comprises the steps of:
recovering a reactor off-gas comprising $H_2$, propylene, ethylene, 1-hexene from the reactor,
feeding the reactor off-gas to a condenser to form a gas-liquid mixture,
feeding the gas-liquid mixture to a separator to obtain a first gas stream comprising $H_2$, ethylene and propylene and a first liquid stream comprising $H_2$, ethylene, propylene and 1-hexene, wherein fresh propylene is further fed to the separator and/or added to the first liquid stream,
feeding the catalyst system to the reactor through a port arranged on the top side of the reactor,
feeding a $H_2$ poor quench liquid comprising propylene to the reactor through the first set of the liquid feed ports,
feeding a $H_2$ rich quench liquid comprising $H_2$, ethylene and propylene and 1-hexene to the reactor through the second set of liquid feed ports, wherein the $H_2$ rich quench liquid comprises at least part of the first liquid stream,
feeding a $H_2$ poor bottom gas comprising fresh propylene through the first set of gas feed ports,
feeding a $H_2$ rich bottom gas comprising $H_2$, ethylene and propylene through the second set of gas feed ports, wherein the $H_2$ rich bottom gas comprises at least part of the first gas stream, and
collecting the polymer particles formed in the agitated bed from the reactor, wherein
fresh ethylene is fed to the reactor by feeding the fresh ethylene to the reactor as a part of the $H_2$ poor bottom gas and/or by feeding the fresh ethylene to the separator or adding the fresh ethylene to the first gas stream and
fresh 1-hexene is fed to the reactor by feeding the fresh 1-hexene to the reactor as a part of the $H_2$ poor quench liquid and/or by feeding the fresh 1-hexene to the separator or adding the fresh 1-hexene to the first liquid stream.

Subsequent Reactors

Alternatively, the terpolymer composition (A) may be prepared by a process comprising producing the first terpolymer (A1) and the second terpolymer (A2) as a bimodal terpolymer made by polymerizing the first terpolymer (A1) and subsequently polymerizing the second terpolymer (A2) in the presence of the first terpolymer (A1). Therefore, in another aspect, the invention relates to a process for the preparation of the polypropylene composition (P) comprising preparing the terpolymer composition by a process comprising the steps of: preparing the first terpolymer (A1) by polymerizing propylene, ethylene and 1-hexene in the presence of a Ziegler-Natta catalyst system using a first set of reaction conditions,
preparing the second terpolymer (A2) by polymerizing propylene, ethylene and 1-hexene in the presence of a Ziegler-Natta catalyst system using a second set of reaction conditions,
wherein the first set of reaction conditions and the second set of reaction conditions differ in one or more conditions chosen from the group of pressure, temperature, propylene concentration, ethylene concentration, 1-hexene concentration and hydrogen concentration.

Therefore, the invention also relates to a process for the preparation of the polypropylene composition (P), wherein the first terpolymer (A1) and the second terpolymer (A2) are prepared in a single reactor to obtain the terpolymer composition, preferably wherein the single reactor is a gas-phase reactor, more preferably wherein the single reactor is a horizontal stirred reactor, preferably wherein the Ziegler-Natta catalyst system used for the preparation of the first and the second terpolymer fraction are the same.

Alternatively, the invention provides a process for the preparation of the polypropylene composition (P), wherein the process comprises a sequential polymerization process comprising at least two reactors connected in series, wherein said process comprises the steps of
preparing the first terpolymer (A1) in a first reactor from propylene, ethylene and 1-hexene using a first set of conditions,
transferring said first terpolymer (A1) and unreacted comonomers of the first reactor to a second reactor,
feeding propylene, ethylene and 1-hexene to said second reactor,
preparing the second terpolymer (A2) in said second reactor in the presence of said first terpolymer fraction using a second set of conditions to obtain the terpolymer composition (A),
wherein the first and second set of conditions differ in one or more conditions chosen from the group of pressure, temperature, propylene concentration, ethylene concentration, 1-hexene concentration and hydrogen concentration.

Preferably, in such sequential polymerization process, each of the reactors is a gas-phase reactor, more preferably each of the reactors is a horizontal stirred reactor.

Preferably, the Ziegler-Natta catalyst system comprises a procatalyst, a co-catalyst and optionally an external electron donor, wherein the procatalyst comprises compounds of a transition metal of Group 4 to 6 of IUPAC, a Group 2 metal compound and an internal donor, preferably wherein said internal donor is a non-phthalic compound. Examples of procatalyst, co-catalyst, external electron donor and internal donors are provided herein.

Blends

Alternatively, the polypropylene composition according to the invention may be prepared by a process comprising melt-mixing the first terpolymer (A1) and the second terpolymer (B1) made in different reactors to obtain the terpolymer composition (A). Preferably, each of the reactors is a gas-phase reactor, for example each of the reactors is a horizontal stirred reactor.

In another embodiment, the terpolymer composition (A) may be unimodal. It is herein understood that the term 'unimodal' means that the terpolymer in the terpolymer composition is a terpolymer, which is unimodal with respect to molecular weight distribution and comonomer content whereby the copolymer can be polymerised in a single stage batch or preferably a continuous process. The polymerization can be a slurry or gas phase, preferably a gas phase technology, e.g. fluidized bed or horizontally stirred reactor.

The unimodal terpolymer is preferably produced in one reactor. However, the unimodal terpolymer may also be produced in a multistage process using, at each stage, process conditions which result in similar polymer properties. The process conditions are substantially the same in these stages, meaning that temperature, pressure, concentrations of the reactants and the catalysts are substantially the same, for example the deviations in each of these conditions is not more than 10%. The use of a one stage polymerization process is advantageous since it is a simple process using only one reactor.

For example, in a preferred embodiment, the amount of terpolymer consisting of units derived from propylene, ethylene and 1-hexene in the terpolymer composition (A) is at least 95 wt % based on the polypropylene composition.

The invention also relates to a polypropylene composition (P) wherein the terpolymer composition (A) comprises a terpolymer (A1) in an amount of at least 95 wt % based on the terpolymer composition,
wherein the terpolymer (A1)
(i) consists of units derived from propylene, ethylene and 1-hexene
(ii) has an amount of ethylene derived units of at least 1.5 wt %; and
(iii) has an amount of 1-hexene derived units of at least 1.5 wt %;
and for example, wherein the terpolymer (A1) has a a ratio of the weight average molecular weight (Mw) to the number average molecular weight (Mn), wherein Mw and Mn are measured according to ASTM D6474-12 in the range from 5.0 to 25.0, for example in the range from 6.0 to 22.0, preferably wherein the terpolymer (A1) preferably has a ratio of the weight average molecular weight (Mw) to the number average molecular weight (Mn), wherein Mw and Mn are measured according to ASTM D6474-12 in the range from 7.0 to 20.0, more preferably in the range from 8.0 to 16.0, for example in the range from 8.0 to 14.0.

The invention further provides a process for the preparation of the polypropylene composition (P), comprising preparing the terpolymer composition (A) polymerizing propylene, ethylene and 1-hexene in the presence of a Ziegler-Natta catalyst system.

Process for the preparation of the polypropylene composition (P) comprising the steps of:
(a) preparing the terpolymer by polymerizing propylene, ethylene and 1-hexene in the presence of a Ziegler-Natta catalyst system,
wherein the Ziegler-Natta catalyst system comprises a procatalyst, a co-catalyst and optionally an external electron donor,
wherein the procatalyst comprises compounds of a transition metal of Group 4 to 6 of IUPAC, a Group 2 metal compound and an internal donor, preferably wherein said internal donor is a non-phthalic compound.

The process for the preparation of the polypropylene composition (P) may further comprise the step of: (b) melt-mixing the terpolymer composition (A), the nucleating agent (B), the optional composition comprising pigment (C) and the optional additives (D) to form the polypropylene composition (P). The melt-mixing of the components may be done in any order. For example, (C) and (D) and optionally (B) may be mixed prior to melt-mixed with (A). Preferably, the composition of the invention is made in a form that allows easy processing into a shaped article in a subsequent step, like in pellet or granular form. The composition can be a mixture of different particles or pellets; like a blend of the heterophasic copolymer and a masterbatch of additives. Preferably, the composition of the invention is in pellet or granular form as obtained by mixing all components in an apparatus like an extruder; the advantage being a composition with homogeneous and well-defined concentrations of the additives. With melt-mixing is meant that (A) is melt-mixed with other components at a temperature that exceeds the melting point of (A). Melt-mixing may be done using techniques known to the skilled person, for example in an extruder. Generally, in the process of the invention, melt-mixing is performed at a temperature in the range from 200° C. to 260° C. Suitable conditions for melt-mixing, such as temperature, pressure, amount of shear, screw speed and screw design when an extruder is used are known to the skilled person.

Ziegler-Natta Catalyst System

Preferably, the Ziegler-Natta catalyst system comprises a solid, titanium-containing component in combination with at least one aluminum alkyl cocatalyst, and preferably an external electron donor. Examples of suitable catalyst systems are for example described in WO2011/155999, on page 7, line 16 to page 10, line 6; and page 10, line 31 to page 13, line 14 incorporated herein by reference.

Procatalyst

Further examples of suitable catalyst systems are described in WO2018059955. The preferred Ziegler-Natta catalyst system comprises a procatalyst, a co-catalyst and optionally an external electron donor, wherein the procatalyst is obtained by a process comprising the steps of Step A) providing or preparing a compound $R^4{}_zMgX^4{}_{2-z}$ wherein $R^4$ is independently selected from linear, branched or cyclic hydrocarbyl group independently selected from alkyl, alkenyl, aryl, aralkyl, or alkylaryl groups, and one or more combinations thereof; wherein said hydrocarbyl group may be substituted or unsubstituted, may contain one or more heteroatoms and preferably has from 1 to 20 carbon atoms;

$X^4$ is independently selected from the group consisting of fluoride (F—), chloride (Cl—), bromide (Br—) or iodide (I—), preferably chloride;

z is in a range of larger than 0 and smaller than 2, being 0<z<2;

Step B) contacting the compound $R^4{}_zMgX^4{}_{2-z}$ with a silane compound $Si(OR^5)_{4-n}(R^6)_n$ to give a first intermediate reaction product, being a solid $Mg(OR^1)_xX^1{}_{2-x}$ wherein $R^1$, $R^5$ and $R^6$ are each independently selected from linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms;

$X^1$ is independently selected from the group consisting of fluoride (F—), chloride (Cl—), bromide (Br—) or iodide (I—), preferably chloride;

n is in range of 0 to 4, preferably n is from 0 up to and including 1;

z is in a range of larger than 0 and smaller than 2, being 0<z<2;

x is in a range of larger than 0 and smaller than 2, being 0<x<2;

Step C) activating said solid support, comprising two sub steps:

Step $C_1$) a first activation step by contacting the first intermediate reaction product obtained in step B) with at least one first activating compound being a metal alkoxide compound of formula $M^1(OR^2)_{v-w}(OR^3)_w$ or $M^2(OR^2)_{v-w}(R^3)_w$; wherein: $M^1$ is a metal selected from the group consisting of Ti, Zr, Hf, Al or Si; $M^2$ is a metal being Si; v is the valency of $M^1$ or $M^2$ and w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms; and a second activating compound being an activating electron donor; and Step $C_2$) a second activation step by contacting the activated solid support obtained in step $C_1$) with an activating electron donor; to obtain a second intermediate reaction product;

Step D) reacting the second intermediate reaction product obtained step $C_2$) with a halogen-containing Ti-compound, optionally an activator prior to or simultaneous with the addition of an internal donor, and at least one internal electron donor to obtain said procatalyst.

Further preferred examples of the procatalyst are mentioned in the claims of WO2018059955, incorporated by reference. Particularly preferred procatalyst is catalyst H used in Example 8 of WO2018059955.

Phthalate Free Internal Donors

It is preferred to use so-called phthalate free internal donors because of increasingly stricter government regulations about the maximum phthalate content of polymers. In the context of the present invention, "essentially phthalate-free" or "phthalate-free" means having a phthalate content of less than for example 150 ppm, alternatively less than for example 100 ppm, alternatively less than for example 50 ppm, alternatively for example less than 20 ppm, for example of 0 ppm based on the total weight of the catalyst. Examples of phthalates include but are not limited to a dialkylphthalate esters in which the alkyl group contains from about two to about ten carbon atoms. Examples of phthalate esters include but are not limited to diisobutylphthalate, ethylbutylphthalate, diethylphthalate, di-n-butylphthalate, bis(2-ethylhexyl)phthalate, and diisodecylphthalate.

Examples of phthalate free internal donors include but are not limited to 1,3-diethers, for example 9,9-bis (methoxymethyl) fluorene, optionally substituted malonates, maleates, succinates, glutarates, benzoic acid esters, cyclohexene-1,2-dicarboxylates, benzoates, citraconates, aminobenzoates, silyl esters and derivatives and/or mixtures thereof.

Activator

The catalyst system comprising the Ziegler-Natta procatalyst may be activated with an activator, for example an activator chosen from the group of benzamides and monoesters, such as alkylbenzoates.

Co-Catalyst

The catalyst system includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst as are known to the skilled person. Preferably, the cocatalyst is selected from trimethylaluminium, triethylaluminum, tri-isobutylaluminum, trihexylaluminum, di-isobutylaluminum hydride, trioctylaluminium, dihexylaluminum hydride and mixtures thereof, most preferably, the cocatalyst is triethylaluminium (abbreviated as TEAL).

External Electron Donor (EED)

Examples of suitable external electron donors are known to the person skilled in the art and include but are not limited to external electron donors chosen from the group of compounds having a structure according to Formula III $(R^{90})_2N$—$Si(OR^{91})_3$, compounds having a structure according to Formula IV: $(R^{92})Si(OR^{93})_3$ and mixtures thereof, wherein each of $R^{90}$, $R^{91}$, $R^{92}$ and $R^{93}$ groups are each independently a linear, branched or cyclic, substituted or unsubstituted alkyl having from 1 to 10 carbon atoms, preferably wherein $R^{90}$, $R^{91}$, $R^{92}$ and $R^{93}$ groups are each independently a linear unsubstituted alkyl having from 1 to 8 carbon atoms, for example ethyl, methyl or n-propyl, for example diethylaminotriethoxysilane (DEATES), n-propyl triethoxysilane, (nPTES), n-propyl trimethoxysilane (nPTMS); and organosilicon compounds having general formula $Si(ORa)_{4-n}R^b{}_n$, wherein n can be from 0 up to 2, and each of $R^a$ and $R^b$, independently, represents an alkyl or aryl group, optionally containing one or more hetero atoms for instance O, N, S or P, with, for instance, 1-20 carbon atoms; such as diisobutyl dimethoxysilane (DiBDMS), t-butyl isopropyl dimethyxysilane (tBuPDMS), cyclohexyl methyldimethoxysilane (CHMDMS), dicyclopentyl dimethoxysilane (DCPDMS) or di(iso-propyl) dimethoxysilane (DiPDMS). More preferably, the external electron donor is chosen from the group of di(iso-propyl) dimethoxysilane (DiPDMS) or diisobutyl dimethoxysilane (DiBDMS).

These catalyst systems of WO2018059955 are phthalate-free. This has the advantage that undesired phthalates will not end up in the drinking water transported by a pipe made by the polypropylene composition (P). Therefore, preferably, the polypropylene composition (P) as well as any articles comprising such composition, such as the pipes of the invention, are essentially phthalate-free. For purposes of the invention, essentially phthalate-free is defined as the presence of less than 0.0001 wt % of phthalates based on the composition, preferably 0.00000 wt % of phthalates based on the composition.

Preferably, the terpolymer in the terpolymer composition (A) is prepared using the Ziegler-Natta catalyst system according to the catalyst system of claim 12 of WO2018059955. If the terpolymer composition (A) comprises a first terpolymer and a second terpolymer, one or both (preferably both) of the first terpolymer fraction and the second terpolymer fraction are prepared using the Ziegler-Natta catalyst system according to the catalyst system of claim 12 of WO2018059955.

Suitable Si/Ti ratios, wherein Si/Ti is the ratio of the external electron donor to the procatalyst, for production of the terpolymer can easily be determined by the person skilled in the art. Suitable Al/Si ratios, wherein Al/Si is the ratio of the co-catalyst to the external donor can easily be determined by the person skilled in the art. The hydrogen concentrations and the reaction conditions may be selected according to known criteria such that desired molecular weights of the terpolymer(s) is/are obtained. The amounts of ethylene and 1-hexene with respect to the amount of propylene to be fed to the reactor may be selected according to known criteria such that desired amounts of ethylene and 1-hexene in the terpolymer are obtained. Conditions for the polymerization, such as temperature and time, pressures of the monomers, avoidance of contamination of catalyst and the use of additives to molecular weights are known to the skilled person. The temperature should be selected to ensure reasonable copolymerization rates and avoid unduly long reactor residence times, but should not be so high as to result in the production of unreasonably high levels of stereorandom products due to excessively rapid polymerization or copolymerization rates. Generally, temperatures range from about 0° to about 120° C. with a range of from about 20° C. to about 95° C. being preferred from the standpoint of attaining good catalyst performance and high production rates. More preferably, polymerization to produce the terpolymer(s) is carried out at temperatures ranging from about 50° C. to about 80° C.

Olefin copolymerization in a gas phase process may be carried out at monomer pressures of about atmospheric or above. Generally, monomer pressures range from about 1.2 to about 40 bar (120 to 4000 kPa), more typically 18 to 26 bar.

The copolymerization time will generally range from about ½ to several hours in batch processes with corresponding average residence times in continuous processes.

Prepolymerization or encapsulation of the catalyst or catalyst component of this invention also may be carried out prior to being used in the polymerization or copolymerization of alpha olefins. A particularly useful prepolymerization procedure is described in U.S. Pat. No. 4,579,836, which is incorporated herein by reference.

After polymerization, polymer powder is removed from the polymerization reactor by methods known to the art, and preferably transferred to a polymer finishing apparatus in which suitable additives are incorporated into the polymer, which is heated, typically by mechanical shear and added heat, in an extruder to above melt temperature, extruded through a die, and formed into discrete pellets. Before processing in the extruder, polymer powder may be contacted with air or water vapor to deactivate any remaining catalytic species.

In another aspect, the invention relates to the polypropylene composition (P) obtained or obtainable by the process of the invention.

In another aspect, the invention relates to a process for the preparation of the pipe of the invention, comprising the step of I. providing the polypropylene composition (P) for example, wherein the polypropylene composition (P) is prepared by a process comprising the steps of:

(a) preparing the terpolymer by polymerizing propylene, ethylene and 1-hexene in the presence of a Ziegler-Natta catalyst system, wherein the Ziegler-Natta catalyst system comprises a procatalyst, a co-catalyst and optionally an external electron donor, wherein the procatalyst comprises compounds of a transition metal of Group 4 to 6 of IUPAC, a Group 2 metal compound and an internal donor, preferably wherein said internal donor is a non-phthalic compound and (b) melt-mixing the terpolymer composition (A), the nucleating agent (B), the optional composition comprising pigment (C) and the optional additives (D) to form the polypropylene composition (P) and II. Extruding the polypropylene composition (P) into a pipe.

The person skilled in the art is aware of how to operate a pipe extrusion process. For example, the pipe of the invention may be produced by first melting the polypropylene composition (P) in an extruder at temperatures in the range of from 200 to 300° C. and then extruding it through an annular die and cooling it.

The extruders for producing the pipe can for example be single screw extruders with an L/D of 20 to 40 or twin screw extruders or extruder cascades of homogenizing extruders (single screw or twin screw). Optionally, a melt pump and/or a static mixer can be used additionally between the extruder and the ring die head. Depending on the desired size of the pipe, ring shaped dies with diameters ranging from approximately 16 to 2000 mm and even greater are possible.

For example, the melt arriving from the extruder is first distributed over an annular cross-section via conically arranged holes and then fed to the core/die combination via a coil distributor or screen. If necessary, restrictor rings or other structural elements for ensuring uniform melt flow may additionally be installed before the die outlet. After leaving the annular die, the pipe is taken off over a calibrating mandrel, usually accompanied by cooling of the pipe by air cooling and/or water cooling, optionally also with inner water cooling.

In another aspect, the invention relates to an article comprising the polypropylene composition (P) according to any one of the preceding claims.

Preferably, the invention relates to an article, wherein the article comprises the polypropylene composition (P) in an amount of at least 95 wt % based on the article. More preferably, the invention relates to a pipe, wherein the pipe comprises the polypropylene composition (P), preferably wherein the pipe comprises the polypropylene composition (P) in an amount of at least 95 wt %, for example of at least 96 wt %, for example of at least 97 wt %, for example of at least 98 wt %, for example of at least 99 wt %. For example the polypropylene composition (P) may be present in an amount of 100 wt % based on the pipe, that is the pipe consists of the polypropylene composition (P).

In another aspect, the invention relates to the use of the composition of the invention for the preparation of pipes.

It is noted that the invention relates to the subject-matter defined in the independent claims alone or in combination with any possible combinations of features described herein, preferred in particular are those combinations of features that are present in the claims. It will therefore be appreciated that all combinations of features relating to the compositions according to the invention; all combinations of features relating to the processes according to the invention and all combinations of features relating to the compositions according to the invention and features relating to the processes according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

Examples
Methods
SEC: Mz, Mn, Mw

Size Exclusion Chromatography (SEC) was performed on the granule samples and Mw, Mn and Mz were all measured in accordance with ASTM D6474-12 (Standard Test Method for Determining Molecular Weight Distribution and Molecular Weight Averages of Polyolefins by High Temperature Gel Permeation Chromatography). Mw stands for the weight average molecular weight and Mn stands for the number average weight. Mz stands for the z-average molecular weight.

In addition to the method specified by ASTM D6474-12, the method was performed using a configuration in which a Polymer Char IRS infrared concentration detector and a Polymer Char online viscosity detector was used to gain 'absolute' (and therefore more accurate) molar masses. Three columns of Polymer Laboratories 13 μm PLgel Olexis, 300×7.5 mm were used in series with 1,2,4-trichlorobenzene stabilized with 1 g/L butylhydroxytoluene (also known as 2,6-di-tert-butyl-4-methylphenol or BHT) as elution.

The molar mass distribution and derived molar masses were determined based on a calibration using linear PE standards (narrow and broad (Mw/Mn=4 to 15)) in the range of 0.5-2800 kg/mol. Samples of polymer granules were mixed with Tris (2,4-di-tert-butylphenyl)phosphite (Irgafos 168) and 1,1,3-Tris (2-methyl-4-hydroxy-5-tert-butylphenyl)butane (Topanol CA) in a weight ratio of sample:Irgafos:Topanol of 1:1:1, after which the mixture thus obtained was dissolved in 1,2,4-trichlorobenzene stabilized with 1 g/L BHT until the concentration of the mixture in 1,2,3-trichlorobenzene stabilized with 1 g/L BHT was 0.03 wt %.

Xylene Solubles (XS)

Powder samples were evaluated for XS, wt % xylene solubles. 1 gram of polymer and 100 ml of xylene are introduced in a glass flask equipped with a magnetic stirrer. The temperature is raised up to the boiling point of the solvent. The so obtained clear solution is then kept under reflux and stirring for further 15 min. Heating is stopped and the isolating plate between heating and flask is removed. Cooling takes place with stirring for 5 min. The closed flask is then kept for 30 min in a thermostatic water bath at 25° C. for 30 min. The so formed solid is filtered on filtering paper. 25 ml of the filtered liquid is poured in a previously weighed aluminium container, which is heated in a stove of 140° C. for at least 2 hours, under nitrogen flow and vacuum, to remove the solvent by evaporation. The container is then kept in an oven at 140° C. under vacuum until constant weight is obtained. The weight percentage of polymer soluble in xylene at room temperature is then calculated.

$^{13}$C-NMR for C2, C6 Comonomer Content

Approximately 150 mg of sample was dissolved at ~135° C. in ~3 ml of 1,1,2,2-tetrachloroethane-d2 (TCE-d2)/BHT stock solution using a 10 mm NMR tube. The stock solution was made by dissolving ~5 mg on BHT in 25 ml of TCE-d2. Oxygen concentration in the tube was reduced by flushing the tube for ~1 min with nitrogen before dissolution. The sample was periodically checked for homogeneity and manually mixed as necessary.

All NMR experiments were carried out on a Bruker 500 Avance III HD spectrometer equipped with a 10 mm DUAL (proton and carbon) cryogenically cooled probe head operating at 125° C. The 13C NMR measurements were performed using a spectral width of 220 ppm, an acquisition time of ~1.4 s and a relaxation delay of 20 s between each of the 512 transients. The spectra were calibrated by setting the central signal of TCE's triplet at 74.2 ppm.

Comonomer content is calculated as described in: F. F. N. Escher, G. B. Galland, J Polym Sci Part A: Polym Chem 42: 2474-2482, 2004

Dynamic Mechanical Spectroscopy (DMS) Analysis for PI (Polydispersity Index)

Compression moulding of the samples was done at 200° C. in consecutive steps; at 0 bar for 1 minute, at 5 bars for 1 minute, at 40 bars for 3 minutes and was completed by a cooling step at 40 bars. The rheological behavior of the samples was studied using a DHR2 torsional rheometer (TA Instruments) equipped with a parallel plate geometry (diameter=25 mm, gap=1000 μm). The rheological profiles were obtained by conducting oscillation frequency sweep experiments. The measurements were performed with the following procedure:
- a) Conditioning step at 230° C. for 60 seconds
- b) Oscillation frequency sweep at 230° C.: frequency 600-0.01 rad/s, 1% strain, logarithmic sweep, 5 pts/decade.

Distorted torque-displacement data points were determined for each sample. Using the Cox-Merz rule and the Trios software, the undistorted rheology data collected in oscillation mode were transformed to the ones in flow mode. The transformed rheological curves were fitted using Yasuda-Carreau model from which a zero-shear viscosity value was obtained. From these, the rheology polydispersity index (PI) of the blends was determined by dividing $10^5$ Pa by the cross-over modulus (which occurs when the storage (G') and loss (G") moduli are equal). This is a convenient measure of polydispersity that is often employed. The PI value could be determined for all polymer blends without the need of extrapolating the cross-over point. PI is calculated as follows:

$$PI = \frac{10^5 Pa}{G_c} \text{ where } G_c \text{ occurs when} (G') \text{ storage modulus} = (G'') \text{ loss modulus}$$

Melt flow rate (MFR)

For purpose of the invention the melt flow rate is the melt flow rate as measured according to ISO1133 (2.16 kg/230° C.).

<Gp>/Ys

Strain hardening modulus divided by yield stress (<Gp>/Ys) were measured by the method described in WO2018/011177:
- a) providing a specimen of the composition by compression molding a sheet from the composition according to ISO 1873-2 to a thickness of 0.3 mm±0,025 mm and punching a specimen having a geometry of the test specimen described in ISO/DIS 18488 from the sheet, wherein the sheet is annealed after the compression molding and before the punching at a temperature of 100° C. for 1 hour and cooled down to room temperature,
- b) elongating the specimen at a constant traverse speed of 20 mm/min at 100° C.,
- c) measuring the load sustained by the specimen during the elongation to obtain a stress-strain curve and measuring the yield stress Y,
- d) calculating true stress-true strain curve from the stress strain curve obtained by step c) and calculating the tensile strain hardening modulus <$G_p$> from the true stress-strain curve, according to the method as described in ISO/DIS 18488 and
- e) calculating a quotient of the tensile strain hardening modulus <$G_p$> divided by the yield stress Y.

Steps b) and c) were performed as follows:

Measurement of the exact dimensions (with accuracy of 0.01 mm) of width (b) and (with an accuracy of 0.005 mm) of thickness (h) of each individual test specimen.

Conditioning of the test specimens for a period of time, e.g. at least 30 minutes, in the temperature chamber set at a predetermined temperature of 100° C. prior to starting the test.

Clamping of the test piece in the upper grip of the elongation device. The clamps are chosen to avoid damage and slippage of the test piece.

Closure of the temperature chamber.

After reaching said predetermined temperature, clamp the test piece with the lower grip.

The sample shall remain between the clamps for a certain period, e.g. at least 1 minute, before the load is applied and measurement starts.

Add a pre-stress e.g. of 0.4 MPa reached with a speed of e.g. 5 mm/min.

During the test, the load sustained by the specimen and the elongation are measured.

Extend the test specimen at a constant traverse speed of 20 mm/min until the test specimen breaks.

For step d), the method of the calculations is described in ISO/DIS 18488, section 8 "Data treatment".

The draw ratio, λ, is calculated from the length, l, and the gauge length, $l_0$, as shown by formula 1.

$$\lambda = \frac{l}{l_0} = 1 + \frac{\Delta l}{l_0} \quad (1)$$

where

Δl is the increase in the specimen length between the gauge marks.

The true stress, $\sigma_{true}$, is calculated according to formula 2, which is derived on the assumption of conservation of volume between the gauge marks:

$$\sigma_{true} = \lambda \cdot \frac{F}{A} \quad (2)$$

where

F is the measured force (N).

It is important that the initial cross section A shall be determined for each individual test bar.

The Neo-Hookean constitutive model (formula 3, see Annex A of ISO/DIN 18488) is used to fit and extrapolate the data from which <Gp> (MPa) for 8<λ<12 is calculated.

$$\sigma_{true} = \frac{\langle G_p \rangle}{20} \cdot \left(\lambda^2 - \frac{1}{\lambda}\right) + C \quad (3)$$

where

C is a mathematical parameter of the constitutive model describing the yield stress extrapolated to λ=0.

Accuracy of fit of data (R2) greater than 0.9 shall be achieved.

The measurement of $G_p$/Y was performed on test specimens made according to ISO1873-2 and ISO/DIS18488 at a constant traverse speed of 20 mm/min and a temperature of 100° C.

Pipe Impact Measurements (Pipe Impact)

Pipe impact measurements were performed on piipes as prepared as described below according to DIN 8078 (2008). The temperature shown is the lowest temperature at which at maximum 1 out of 10 pipes fails.

Hydrostatic Pipe Pressure Testing (Pipe Pressure)

According to ISO1167-1:2006, a run time without failure of the pipes prepared as described below, was measured while a hoop stress of 4.2 Mpa measured according to ISO3213:2009 was applied to the pipe at a temperature of 95° C. (or hoop stress 7.5 Mpa at 70° C. or hoop stress 13.0 MPa at 20° C. or hoop stress 15.5 Mpa at 20° C.).

Examples

The procatalyst used for the preparation of the terpolymer(s) was procatalyst H (Ex. 8) of WO2018/059955A1. The composition of the solid procatalyst H produced is given in Table 1.

TABLE 1

Composition of solid procatalyst H

| Catalyst | Example | d50 [μm] | Mg [%] | Ti [%] | ID [%] | Activator (EB) [%] | EtO [%] |
|---|---|---|---|---|---|---|---|
| H | 8 | 22.16 | 19.65 | 2.40 | 8.41 | 6.68 | 1.48 |

The polymerization to produce terpolymer 1 (terpol. 1) and terpolymer 2 (terpol. 2) was performed in a gas phase fluidized bed polymerization reactor using the above described procatalyst.

The polymerization to produce terpolymer 3 (terpol. 3) was performed on a horizontal gas phase polymerization reactor using above described catalyst.

For all examples, triethylaluminium (TEAL) was used as the co-catalyst. Different external electron donors (EED) were used: ADT5500 (as commercially available from Grace) was used for terpol. 1 and terpol. 2, di-isopropyl-dimethoxysilane (P-donor) was used for terpol. 3.

The reactor conditions used for the different terpolymers were as described in Table 2 below. The resulting properties of the terpolymers, measured as described herein, are indicated in Table 4.

TABLE 2

Process conditions.

|  |  | terpol. 1 | terpol. 2 | terpol. 3 |
|---|---|---|---|---|
| EED |  | ADT 5500 | ADT 5500 | P-donor |
| Al/Si | molar ratio | 2.7 | 2.7 | 3.3 |
| Al/Ti | molar ratio | 110 | 110 | 50 |
| T | C. | 66 | 66 | 68 |
| P | Barg | 26 | 26 | 18 |
| H2/C3 | mol/mol | 0.004 | 0.003 | 0.006 |
| C2/C3 | mol/mol | 0.012 | 0.011 | 0.015 |
| C6/C3 | mol/mol | 0.022 | 0.02 | 0.015 |
| Properties of the powder produced |  |  |  |  |
| XS | wt % | 5.3 | 4.9 | 5.3 |
| TC2 | wt-% | 2.6 | 1.5 | 3.0 |
| TC6 | wt-% | 2.5 | 2.2 | 2.2 |
| wt. ratio TC2/TC6 |  | 1.04 | 0.68 | 1.4 |
| Mw/Mn |  | — | 9.4 | 9.5 |

Al/Ti is the molar ratio of the co-catalyst (TEAL) to the procatalyst

Al/Si is the molar ratio of the co-catalyst (TEAL) to the external electron donor (EED)

$H_2/C_3$ is the molar ratio of hydrogen to propylene.

$C_2/C_3$ is the molar ratio of ethylene to propylene.

$C_6/C_3$ is the molar ratio of 1-hexene to propylene.

TC2 is the total amount of ethylene-derived units in the produced powder composition.

TC6 is the total amount of 1-hexene derived units in the produced powder composition.

The powder was collected and granulate was prepared by melt-mixing the powders with the additives (see Table 3 below) in a double screw Krauss Maffei Berstdorff extruder. The temperature profile of the extruder (ZE25/43D) was:

20, 20, 30, 50, 150, 180, 210 (3×), 225, 260, 260° C. The throughput was 13 kg/hr. The additives (antioxidants, acid scavengers) were used in the amounts indicated below in Table 3, which shows the details of the granulates and were mixed prior to dosing to the extruder.

rPP: random propylene-ethylene copolymer, commercially available from SABIC as SABIC® Vestolen P 9421

HPN20 is Hyperform® HPN20-E as commercially available from Milliken & Company. CMB is a masterbatch composition consisting of:

58.8 wt % propylene homopolymer 595P having a melt flow rate as measured using ISO1133-1:2011 at 230° C. and 2.16 kg of 10.5 dg/min, as commercially available from SABIC 25 wt % zinc sulfide (CAS No. 1314-98-3), 13.3 wt % C.I. pigment brown 24 (CAS No. 68186-90-3)

2.67 wt % C.I. pigment green 7 (CAS No. 1328-53-6) and 0.19 wt % C.I. pigment black 7 (CAS 1333-86-4)

Irganox® 1010 (1010) is the phenolic antioxidant (PA) pentaerythritol tetrakis (3-(3,5-di-tert-butyl-4-hydroxyphenyl)propionate) and is commercially available from BASF.

Irgafos® 168 (168) is tris(2,4-di-tert-butylphenyl)phosphite, having the CAS number of 31570-04-4 and is commercially available from BASF.

Irganox® 1330 (1330) is the phenolic antioxidant, (1,3,5-trimethyl-2,4,6-tris(3,5-di-t-butyl-4-hydroxybenzyl)benzene and is commercially available from BASF.

TABLE 3 polypropylene composition (granulate)

|  |  | E1 | E2 | E3 | CE1 | CE2 | CE3 | CE4 | CE5 |
|---|---|---|---|---|---|---|---|---|---|
| terpol. 1 | wt % | 98.95 |  |  | 98.95 |  |  |  |  |
| terpol. 2 | wt % |  |  |  |  | 98.95 |  |  |  |
| terpol. 3 | wt % |  | 98.95 | 97.95 |  |  | 98.95 | 97.95 |  |
| rPP |  |  |  |  |  |  |  |  | 98.95 |
| HPN 20 | wt % | 0.05 | 0.05 | 0.05 |  |  |  |  |  |
| CMB | wt % |  |  | 1.0 |  |  | 1.0 |  |  |
| 1010 | wt % | 0.3 | 0.3 | 0.3 | 0.3 | 0.3 | 0.3 | 0.3 | 0.3 |
| 168 | wt % | 0.2 | 0.2 | 0.2 | 0.2 | 0.2 | 0.2 | 0.2 | 0.2 |
| 1330 | wt % | 0.5 | 0.5 | 0.5 | 0.5 | 0.5 | 0.5 | 0.5 | 0.5 |
| Calcium stearate | wt % | 0.05 | 0.05 | 0.05 | 0.05 | 0.05 | 0.05 | 0.05 | 0.05 |

Preparation of the Pipes

20×3.4 mm pipes were extruded on a Reifenhauser S50 1 with a barrier screw operated at 35 rpm. The die head temperature profile was set to 40/190/200/205/205° C. and the temperature profile of the extruder was set to 205/205/205/205° C. The extruded pipes were cooled to a temperature of 20° C. The pipe impact and the pipe pressure were then measured on the pipes as described above.

TABLE 4

| | | Results | | | | | | | |
|---|---|---|---|---|---|---|---|---|---|
| Exp Nr. | | E1 | E2 | E3 | CE1 | CE2 | CE3 | CE4 | CE5 |
| MFI 2.16 kg | dg/min | 0.18 | 0.20 | 0.20 | 0.18 | 0.19 | 0.20 | 0.14 | 0.30 |
| PI | | 5.3 | 5.8 | 5.9 | 5.3 | 5.9 | 5.9 | 5.8 | 3.9 |
| $<Gp>/Ys$ @100° C. | — | 10.4 | 9.3 | 9.0 | 11.7 | 9.0 | 8.4 | 10.2 | 6.0 |
| Izod (II) | | 23.8 | 20.2 | 18 | 8.0 | 5.8 | 12.5 | 5.4 | |
| pipe impact | ° C. | −4 | −4 | −3 | −2 | −2 | −1 | 2 | |
| Pipe pressure 20° C., 15.5 Mpa | hr | 64 (D) | | | 34 (D) | | | | 26 (D) |
| Pipe pressure 20° C., 13 Mpa | hr | >11866 | | | 9539 (D) | | | | 2966 (D) |
| Pipe pressure 70° C., 7.5 Mpa | hr | 93 (D) | | | 7 (D) | | | | 6.2 (D) |
| Pipe pressure 95° C., 4.2 Mpa | hr | >11688 | | | >11688 | | | | 2256 (B) |

*(D) = ductile failure
*(B) = brittle failure

As can be seen from Table 4, a polypropylene composition according to the invention has a high pipe impact (pipe impact) in combination with a high hydrostatic pipe pressure resistance (pipe pressure).

The invention claimed is:

1. A pipe comprising a polypropylene composition (P) comprising a terpolymer composition (A), a nucleating agent (B) and optionally a composition comprising pigment (C),
wherein the terpolymer composition (A) comprises at least one terpolymer prepared from propylene, ethylene and 1-hexene,
wherein the nucleating agent (B) is a nucleating agent comprising a metal salt of hexahydrophthalic acid represented by formula (I)

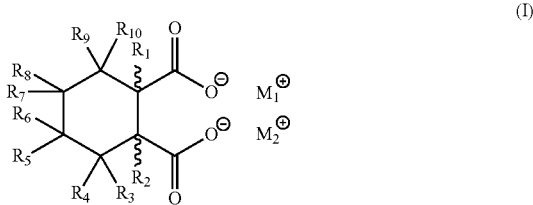

(I)

wherein $M_1$ and $M_2$ are the same or different, and may be combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogens, and phenyl;
wherein the polypropylene composition (P) has a melt flow rate in a range from 0.10 to 0.50 dg/min as determined by ISO1133-1:2011 at 230° C. and 2.16 kg;
wherein an amount of ethylene derived units in the polypropylene composition (P) is from 1.7 to 3.0 wt %, and an amount of 1-hexene derived units in the polypropylene composition (P) is in a range from 1.7 to 4.0 wt %, and $TC2>TC6-0.20$, wherein TC2 stands for a total amount of ethylene-derived units in the polypropylene composition in wt % and wherein TC6 stands for a total amount of 1-hexene derived units in the polypropylene composition in wt %.

2. The pipe comprising the polypropylene composition (P) according to claim 1, wherein in the polypropylene composition (P), a weight ratio of a total amount of ethylene derived units to a total amount of 1-hexene derived units in the polypropylene composition (P) is at least 0.70, and/or at most 3.0.

3. The pipe comprising the polypropylene composition (P) according to claim 1, wherein the polypropylene composition (P) has a melt flow rate as determined by ISO1133-1:2011 at 230° C. and 2.16 kg of from 0.10 to 0.30 dg/min.

4. The pipe comprising the polypropylene composition (P) according to claim 1, wherein an amount of ethylene derived units in the polypropylene composition (P) is from 1.8 to 2.8 wt %.

5. The pipe comprising the polypropylene composition (P) according to claim 1, wherein an amount of 1-hexene derived units in the polypropylene composition (P) is in a range from 1.8 to 3.0 wt %.

6. The pipe comprising the polypropylene composition (P) according to claim 1, wherein $TC2>TC6-0.10$, wherein TC2 stands for a total amount of ethylene-derived units in the polypropylene composition in wt % and wherein TC6 stands for a total amount of 1-hexene derived units in the polypropylene composition in wt %.

7. The pipe comprising the polypropylene composition (P) according to claim 1, wherein the polypropylene composition (P) has a ratio of the weight average molecular weight (Mw) to the number average molecular weight (Mn), wherein Mw and Mn are measured according to ASTM D6474-12 is in a range from 5.0 to 25.0, and/or wherein the polypropylene composition (P) has a polydispersity index (PI) in a range from 4.0 to 15.0, wherein the PI is determined by dividing $10^5$ Pa by the cross-over modulus $G_c$, wherein the $G_c$ occurs when the storage (G') and loss (G") moduli of the polypropylene composition are equal and wherein G' and G" are measured with dynamic mechanical spectroscopy.

8. The pipe comprising the polypropylene composition (P) according to claim 1, wherein the polypropylene composition (P) has a $<Gp>/Y$ of at least 7.0, wherein $<Gp>$ stands for the strain hardening modulus and Y stands for the yield stress and wherein $<Gp>/Y$ is determined by:
a) providing a specimen of the polypropylene composition by compression molding a sheet from the polypropylene composition according to ISO 1873-2 to a thickness of 0.3 mm ±0.025 mm and punching a specimen having a geometry of a test specimen described in ISO/DIS 18488 from the sheet, wherein the sheet is annealed after the compression molding and before the punching at a temperature of 100° C. for 1 hour and cooled down to room temperature, b) elongating the specimen at a constant traverse speed of 20 mm/min at 100° C., c) measuring the load sustained by the specimen during the elongation to obtain a stress-strain curve and measuring the yield stress Y, d) calculating true stress-true strain curve from the stress strain curve obtained by step c) and calculating the tensile strain hardening modulus <Gp>from the true stress-strain curve, according to the method as described in ISO/DIS 18488, and e) calculating a quotient of the tensile strain hardening modulus <Gp>divided by the yield stress Y.

9. The pipe comprising the polypropylene composition (P) according to claim 1, wherein the lowest temperature at which at most 1 out of 10 pipes made from the polypropylene composition fails as determined by DIN8078 (2008) is 0.0° C.

10. The pipe comprising the polypropylene composition (P) according to claim 1, wherein the nucleating agent (B) comprises a cyclic dicarboxylate salt compound having the formula (II)

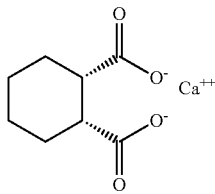

(II)

and/or wherein the nucleating agent (B) is present in an amount from 10 to 5000 ppm based on the polypropylene composition (P).

11. The pipe comprising the polypropylene composition (P) according to claim 1, wherein pigment (C) is an inorganic pigment, and/or wherein the pigment (C) is present in an amount from 0.10 to 2.5 wt % based on the polypropylene composition (P).

12. The pipe comprising the polypropylene composition (P) according to claim 1, wherein the sum of the amount of terpolymer composition (A), nucleating agent (B) and a composition comprising pigment (C) is at least 95 wt % based on the polypropylene composition (P).

13. The pipe comprising the polypropylene composition (P) according to claim 1, wherein the terpolymer composition (A) comprises a first terpolymer (A1) consisting of units derived from propylene, ethylene and 1-hexene and a second terpolymer (A2) consisting of units derived from propylene, ethylene and 1-hexene and wherein the first terpolymer (A1) has a melt flow rate as determined by ISO1133-1:2011 at 230° C. and 2.16 kg in a range from 0.0030 to 1.0 dg/min, wherein the second terpolymer (A2) has a melt flow rate as determined by ISO1133-1:2011 at 230° C. and 2.16 kg in a range from 0.30 to 70.0 dg/min.

14. The pipe comprising the polypropylene composition (P) according to claim 13, wherein a weight ratio of the first terpolymer (A1) to the second terpolymer (A2) in the polypropylene composition (P) is in the range from 0.20 to 5.0.

15. The pipe comprising the polypropylene composition (P) according to claim 13, wherein the polypropylene composition (P)

wherein the terpolymer composition is present in the polypropylene composition (P) in an amount of at least 95 wt % based on the polypropylene composition (P).

16. The pipe comprising the polypropylene composition (P) according to claim 1, wherein an amount of terpolymer consisting of units derived from propylene, ethylene and 1-hexene in the terpolymer composition (A) is at least 95 wt % based on the polypropylene composition, wherein the terpolymer composition comprises a terpolymer (A1) in an amount of at least 95 wt % based on the terpolymer composition, wherein the terpolymer (A1)

(i) consists of units derived from propylene, ethylene and 1-hexene (ii) has an amount of ethylene derived units of at least 1.5 wt %; and (iii) has an amount of 1-hexene derived units of at least 1.5 wt %.

17. The pipe comprising the polypropylene composition (P) according to claim 16, wherein the terpolymer (A1) has a ratio of the weight average molecular weight (Mw) to the number average molecular weight (Mn), wherein Mw and Mn are measured according to ASTM D6474-12 in a range from 7.0 to 20.0.

18. The pipe comprising the polypropylene composition (P) according to claim 1, wherein the article comprises the polypropylene composition (P) in an amount of at least 95 wt % based on the pipe.

19. The pipe comprising the polypropylene composition (P) according to claim 1, wherein the terpolymer consists of units derived from propylene, ethylene and 1-hexene;

wherein in an amount of the terpolymer in the terpolymer composition (A) is at least 95 wt % based on the polypropylene composition, wherein the polypropylene composition (P) has a ratio of the weight average molecular weight (Mw) to the number average molecular weight (Mn), wherein Mw and Mn are measured according to ASTM D6474-12 is in a range from 8 to 16, and wherein the nucleating agent (B) comprises a cyclic dicarboxylate salt compound having the formula (II)

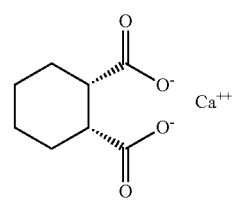

(II)

and, the nucleating agent (B) is present in an amount from 10 to 5000 ppm based on the polypropylene composition (P).

20. The pipe of comprising the polypropylene composition (P) according to claim 19, wherein an amount of ethylene derived units in the polypropylene composition (P) is from 1.8 to 2.8 wt %, an amount of 1-hexene derived units in the polypropylene composition (P) is in a range from 1.8 to 3.0 wt %, and TC2>TC6.

* * * * *